(12) United States Patent
Pedersen

(10) Patent No.: US 6,343,820 B1
(45) Date of Patent: Feb. 5, 2002

(54) BUMPER, AND THE FABRICATION THEREOF

(75) Inventor: Roald Pedersen, Gjøvik (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/509,097

(22) PCT Filed: Aug. 21, 1998

(86) PCT No.: PCT/NO98/00247

§ 371 Date: Jun. 5, 2000

§ 102(e) Date: Jun. 5, 2000

(87) PCT Pub. No.: WO99/15365

PCT Pub. Date: Apr. 1, 1999

(30) Foreign Application Priority Data

Sep. 22, 1997 (NO) .............................................. 974375

(51) Int. Cl.$^7$ .............................................. B60R 19/02
(52) U.S. Cl. ...................................... 293/102; 293/122
(58) Field of Search .............................. 293/120, 121, 293/122, 132, 133, 155, 102

(56) References Cited

U.S. PATENT DOCUMENTS

| | | | |
|---|---|---|---|
| 3,827,740 A | * | 8/1974 | Golze et al. |
| 3,895,835 A | | 7/1975 | Thomson |
| 3,938,841 A | * | 2/1976 | Glance et al. |
| 5,078,439 A | * | 1/1992 | Terada et al. ............... 293/122 |
| 5,340,178 A | | 8/1994 | Stewart et al. |
| 5,803,517 A | * | 9/1998 | Shibuya ....................... 293/120 |
| 5,997,058 A | * | 12/1999 | Pedersen ..................... 293/102 |
| 6,003,912 A | * | 12/1999 | Schonhoff et al. .......... 293/122 |

FOREIGN PATENT DOCUMENTS

| | | |
|---|---|---|
| DE | 195 19 110 | 12/1995 |
| EP | 0 652 138 | 5/1995 |
| EP | 0 687 743 | 12/1995 |

* cited by examiner

*Primary Examiner*—Joseph D. Pape
(74) *Attorney, Agent, or Firm*—Wenderoth, Lind & Ponack, L.L.P.

(57) ABSTRACT

Enclosed and described is a bumper comprising an arched member having an outer wall, an inner wall, a hollow interior between the outer wall and the inner wall, and at least one dividing wall or protrusion dividing at least part of the hollow interior into at least two chambers. The arched member has different cross sections along its length. These cross sections include a first cross section on each side of a central portion of the arched member, which first cross section corresponds to the cross section of a blank from which the beam or bumper is produced. A second cross section is provided at the central portion of the arched member, wherein the second cross section exhibits a region that extends outwardly relative to the first cross section. And, a third cross section is provided adjacent to each terminal end of the arched member, wherein the third cross section is generally the same as the first cross section, or is different from the first cross section such that the first cross section exhibits a region that extends outwardly relative to the third cross section.

27 Claims, 6 Drawing Sheets

FIG. 10

BUMPER, AND THE FABRICATION THEREOF

FIELD OF THE INVENTION

The present invention relates to an improved structural beam, or bumper, especially for a vehicle, comprising an elongated profile which upon collision is adapted for absorbing collision energy and forces. The bumper is prepared from a complete and hollow blank and is provided with different cross sections along a more or less arched section.

The invention also relates to a method for fabrication of such a structural beam or bumper.

PRIOR ART

The applicant's own patent application WO 97/27082 discloses a structural beam or bumper prepared from a complete and hollow blank that is provided with different cross sections along its more or less arched extension. The bumper has a compressed or folded cross section at the areas of each of the terminal portions, while the cross sections at each side of its center are substantially unchanged. The center of the bumper is provided with an outwardly pressed cross section. The manipulated cross section of the bumper contributes to an improved bumper with very good flexing characteristics. Meanwhile, bumpers of this type involving one single chamber will often require the use of quite comprehensive forming operations to achieve the desired shape of the bumper. Further, single chamber beams may be prone to buckling under high loads.

The present invention involves substantial improvements of such a structural beam or bumper and the fabrication thereof.

U.S. Pat. No. 5,340,178 discloses a hollow beam having a reinforcing web of a generally S-shaped configuration interconnecting outer and inner walls of the beam. The beam can be in the shape of a straight tubular section before being formed to a curved or bent configuration. The disclosure does not indicate that the cross section of the beam is manipulated as such, it just indicated that the beam may be curved or have its end portions bent rearwardly. Thus the beam is not provided with different cross sections along its extension and is therefore merely of a constant cross section type beam. Further, the beam configuration is not very suitable for being formed in accordance with the present invention because the S-shaped web will not be able to transmit forces between the outer and inner walls in a sufficient manner during the forming process as compared to that of the present invention.

EP-A-0 687 743 discloses an aluminium alloy bumper-reinforcing material, comprising specified amounts of alloying elements. The figures of the disclosure relate to a bumper having three chambers with its end portions bent rearwardly as such, but the bumper is not manipulated to different cross sections along the extension of the bumper, i.e. the bumper has a constant cross section along its extension.

BACKGROUND OF THE INVENTION

An object of the present invention is the task of providing an improved bumper which combines the protection of a vehicle and persons in the vehicle upon collision. In addition, it is a further object of the invention to provide an improved method for fabrication of such a bumper.

The invention has as one of its objectives to provide a bumper which excels in high torsional stiffness, combined with great bending softness.

A further objective of the invention is to provide a bumper that allows for rational and sturdy attachment thereof to the frame of the vehicle.

An object of the invention is also to provide an elastic and relatively slender structural beam or bumper, which in relation to previously known profile based, closed bumpers, may absorb more elastic and plastic bending energy per unit quantity of used material.

Further, the invention relates to a method which renders a more rational and simplified production of profile based, closed bumpers, with the method at the same time being specifically favorable for high rate forming in a production line.

BRIEF DESCRIPTION OF THE INVENTION

These and other objects are achieved in a bumper of the type as stated previously, which relates to a structural beam or bumper, especially for a vehicle. The bumper comprises an elongated profile which upon collision is adapted for absorbing collision energy and forces. The bumper is preferred from a complete and hollow blank, and is further provided with different cross sections along its more or less arched extension. The bumper has an unchanged, or compressed or folded cross section, at the areas of each of the terminal portions, a substantially unchanged basic cross section at each side of its center, and at its center an outwardly pressed cross section relative to the basic cross section. The bumper also has one outer wall portion and one inner wall portion. The bumper is characterized in that at least one part of the interior section of the structural beam or bumper is divided by at least one protrusion or one dividing wall, whereby the interior section of the beam or bumper comprises at least two chambers.

In accordance with the bumper of the instant invention, there is achieved favorable cross sections along the length of the bumper that sustain very good elasticity properties. Further, according to the invention, the manipulated cross section of the bumper may be formed by a simplified forming operation.

A specific embodiment of such a bumper may have a cross section at the center defined by an outer wall portion and an inner wall portion, with the outer wall portion having a larger height than that of the inner wall portion. Slanted yoke portions interconnect the outer wall portion and the inner wall portion. At least one dividing wall extends substantially perpendicularly from the inner wall portion, and the outer wall portion has a concave exterior face. The cross section at each side of the center comprises a less concave, generally flat or convex outer wall portion, an arched inner wall portion, as well as yoke portions extending substantially perpendicularly from the outer wall portion, with the dividing wall extending substantially perpendicularly from the inner wall portion. At each side of the center, the outer wall portion has substantially the same height, or has slightly a larger height than that of the cross section at the center, and the inner wall portion is of lesser height. The cross section at the terminal portions is defined by an outer wall portion having a height as large as that of the cross section at the center, an inner wall portion having a larger height than the height of the inner wall portion at the center of the bumper, and intermediate arched, sharp cornered or wavy yoke portions.

Further, it is appropriate that this type of bumper comprises a closed cross section having an inner wall portion with a relatively large wall thickness compared to that of the dividing wall and the yoke portions, and an outer wall portion provided with a relatively large wall thickness at its upper and lower parts as compared to that of the dividing wall and the yoke portions. Advantageously, the transitions of thickness in the walls of the cross sections of the bumper are smooth.

Further, it is to be understood that the outer wall portion can be substantially straight, or can be provided with a more or less contoured shape.

Further, appropriately, the terminal portions may be so prepared that they merge into attachment portions which are provided with individual grids, or alternatively into net parallel surfaces that can be placed against associated side beams for attachment thereto.

Further, it is to be understood that the bumper may be prepared substantially symmetrically about a central plane extending in the longitudinal direction of the car, and can be provided with an outer mantle of plastic material.

The method for fabrication of a such a structural beam or bumper comprises the use of various forming operations. The beam or bumper is prepared from a complete hollow blank with the interior of the blank being divided by at least one protrusion or one dividing wall. At least in the center portion of the blank, the forming operations result in the dividing wall transmitting forces between the outer and the inner wall of the beam such that the blank is processed to have an outwardly pressed cross section at this portion. In other words, the dividing wall transmits forces in an advantageous manner during the forming operation of the bumper. In crash situations, the dividing wall will be an effective contribution to improve the energy absorbing properties of the bumper.

In one embodiment of the method, the processing of the blank takes place in a first stretching or pressing operation to provide the blank with a main shape, especially a vaguely arched shape in the longitudinal direction of the blank. Thereafter, the blank, at the same time or in subsequent processing operations, is processed at its center portion and compressed at its terminal portions. Preferably, the sections on each side of the center remain unprocessed.

Advantageously, as a blank is used an extruded profile having a closed cross section, with the inner wall portion and the ends of the outer wall portion having relatively larger wall thicknesses than the wall thicknesses of the intermediate yoke portions and the dividing wall, and with the transitions of thickness in the walls of the cross sections of the bumper being smooth. The enlarged thicknesses of the inner and outer walls are particularly advantageous while performing the forming operations on the blank, as these enlarged wall sections can be clamped during the forming operations and thereby improve the ability to manipulate the cross section of the blank to the desired form.

The bumper can be manufactured by outer processing, with the outer processing being performed by mechanical tools. Alternatively, hydroforming can be used.

Further advantages and specific features of the present invention will appear from the following description taken in connection with the attached drawings, as well as from the appended patent claims.

DESCRIPTION OF THE PREFERRED EMBODIMENTS

Figure 1:
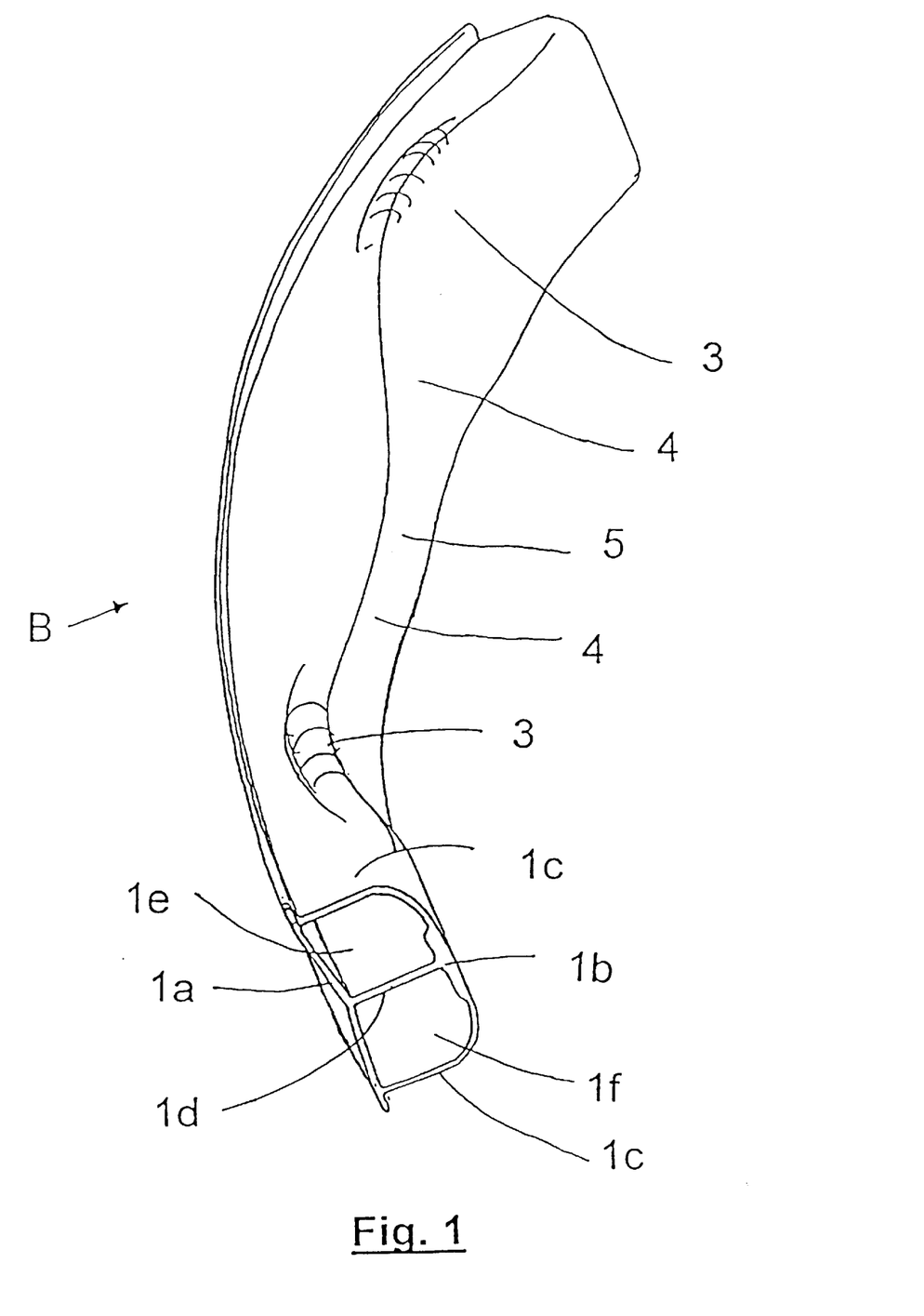
FIG. 1 is a perspective view of a blank with reformed cross-sections.

FIG. 1 shows a perspective view of a blank B with reformed cross-sections. The blank has an outer wall portion 1a and an inner wall portion 1b. In its center portion 5, the blank is processed to a shape where the distance between the outer and inner wall portions is at a maximum. Further the blank is compressed or folded at the portions 3. At the portions 4 between the center portion 5 and the portions 3, together with the outermost ends of the blank, the original shape of the profile is substantially maintained. This shape comprises a flat or contoured outer wall portion 1a, an arched inner wall portion 1b, as well as yoke portions 1c extending substantially perpendicularly from the outer wall portion 1a. A dividing wall 1d extends substantially perpendicularly from the inner wall portion 1b, dividing the interior section of the blank into two chambers 1e and 1f. After forming, the blank may be further processed (not shown). Such processing may comprise cutting to a obtain proper length, drilling or punching of holes.

Figure 2:
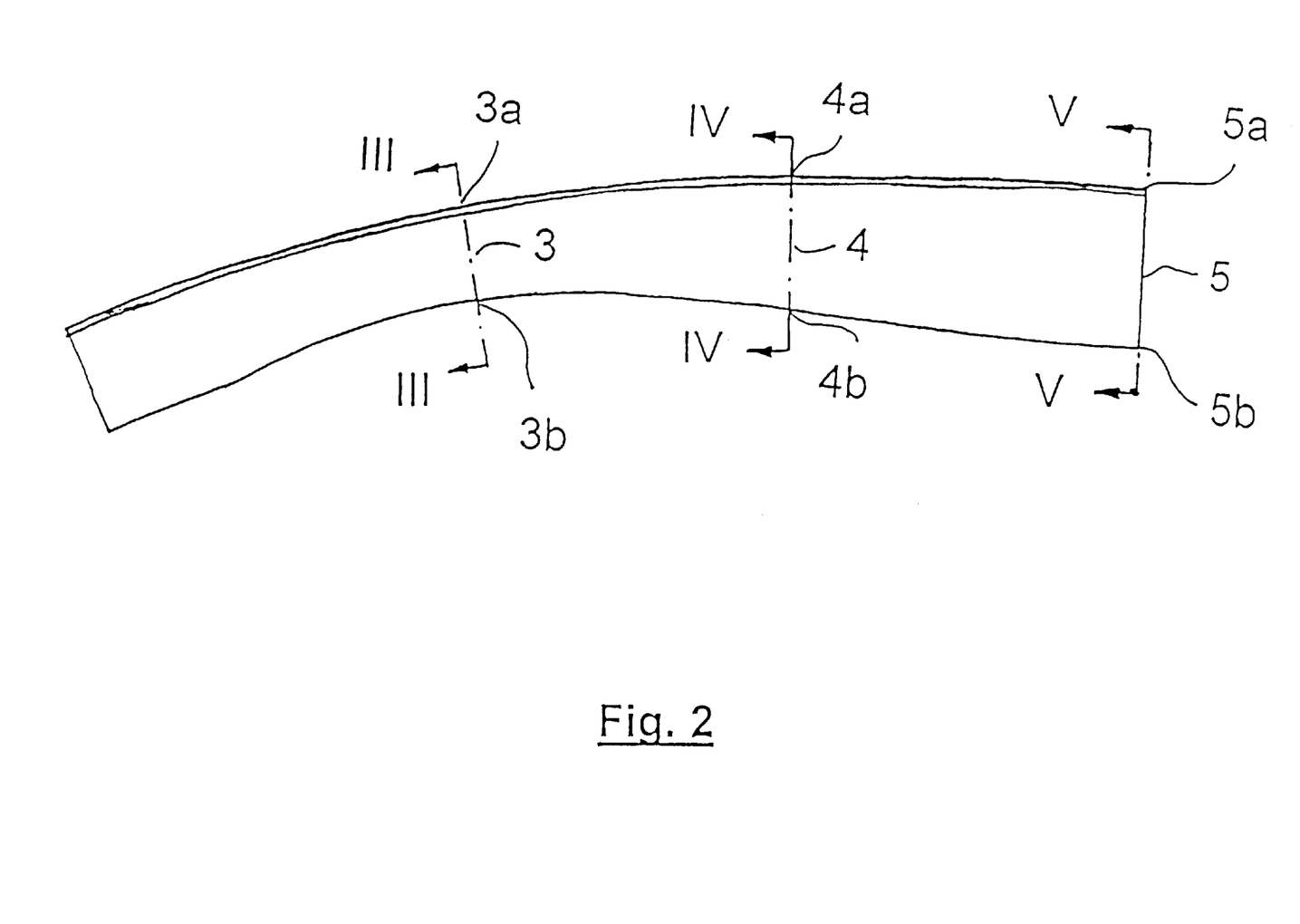
FIG. 2 shows a schematic view as seen from above of a symmetrical half of a structural beam, especially a bumper beam according to the invention.

FIG. 2 shows a schematic view as seen from above of a symmetrical half of a structural beam, especially a bumper beam according to the invention.

Figure 3:
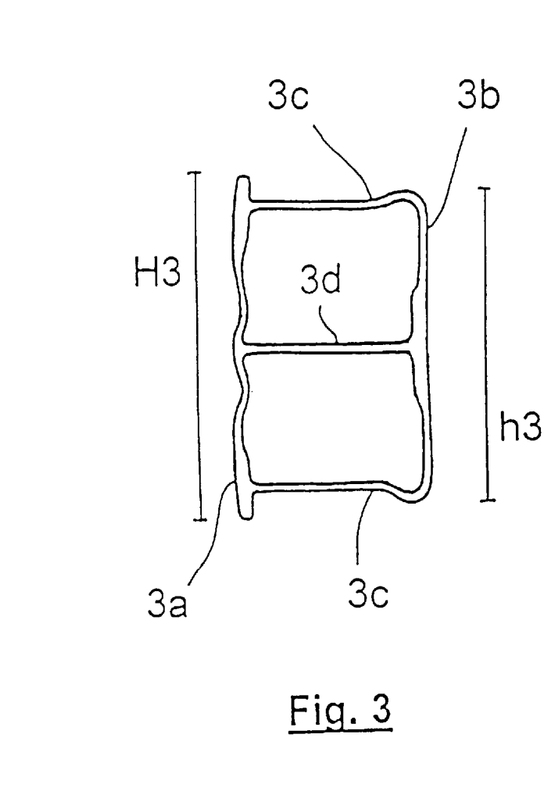
FIGS. 3, 4, and 5 are cross sections taken along the lines III—III, IV—IV and V—V, respectively, of FIG. 2.
Figure 4:
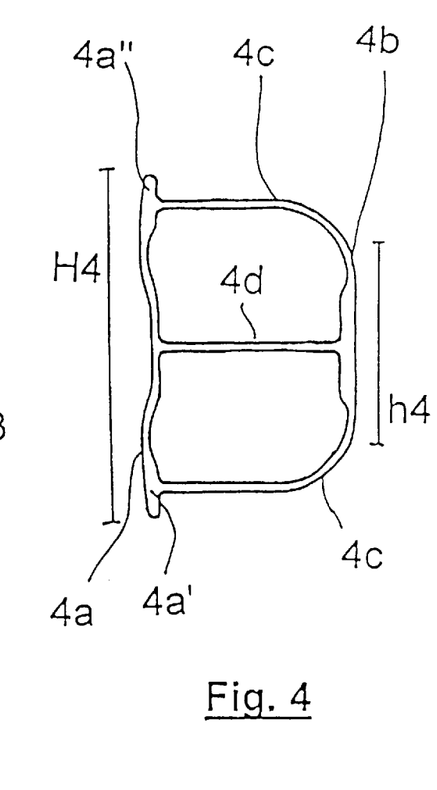
Figure 5:
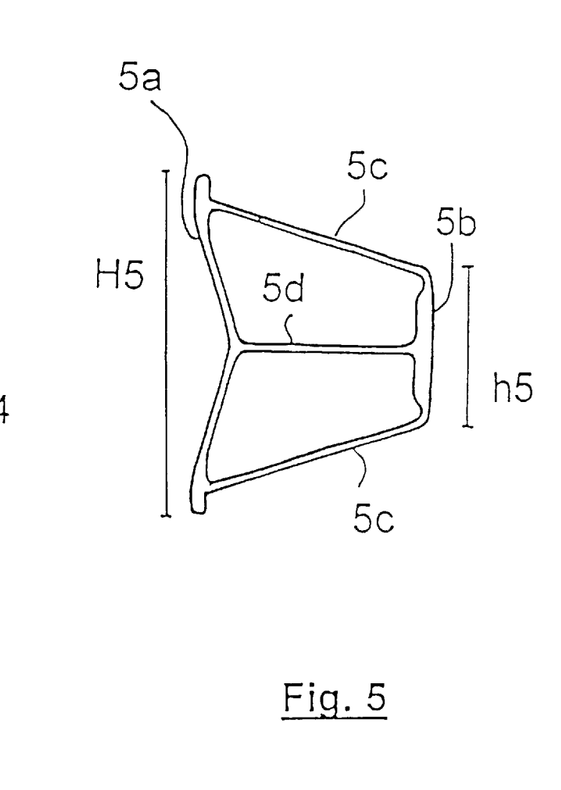

FIGS. 3, 4, and 5 represent cross sections taken along the lines III—III, IV—IV as well as V—V, respectively, illustrated in FIG. 2. These cross sections correspond respectively to the portions 3, 4, and 5 of the blank.

The beam or bumper rail as shown in FIGS. 2–5, is illustrated in its finished processed form, and is as such adapted for absorbing collision energy and forces when used in a car. The rail is preferably used as a bumper, but it can also be uses as a supporting beam in the overall structure of the car.

The bumper is made from a complete and hollow extruded blank (B) which is manufactured from an extrudable material, for example aluminium, or any other materials or alloys having corresponding extrudable and strength-related properties. The blank has in its initial form a basic cross section 4 which is specifically illustrated in FIG. 4, and which comprises an outer wall portion 4a being generally flat or contoured, an arched inner wall portion (4b), as well as yoke portions (4c) extending substantially perpendicularly from the outer wall portion (4a), and a dividing wall (4d) that extends substantially perpendicularly from the inner wall portion (4b).

This basic cross section 4 is on both sides of the center, see IV—IV in FIG. 2 and FIG. 4, and according to the present invention maintained so to stay unchanged. At the center portion itself, see V—V in FIG. 2 and FIG. 5, the basic cross section has been given an outwardly pressed cross section 5. And, in the areas of the terminal portions, here at section III—III in FIG. 2, see also FIG. 3, the basic cross section 4 has been compressed or folded to a further cross section 3, which is different from the basic cross section that has not been processed.

In other words, the bumper rail 1 is manufactured on the basis of a basic cross section on each side of the center, and an outwardly pressed cross section at the center in relation to the basic cross section, as well as a compressed or folded cross section in the areas of each of the terminal portions. Alternatively, the areas of each of the terminal portions can remain unchanged.

It is to be understood that the transition between the basic cross section 4 and the center cross section 5 and the terminal cross section 3, respectively, is gradual and smooth, and can, of course, be varied within large ranges.

Further, it is to be understood that the outer wall portion can deviate from the wall portion 4a as illustrated, namely by being substantially straight, or can be designed with a more or less contoured shape.

In the embodiment which is specifically illustrated in FIGS. 2–5, the cross section 5 at the center, see specifically FIG. 5, is pressed out to a cross section where the concavity of the outer wall portion 5a is augmented. The inner wall portion 5b is straight and has substantially the same height h5 as the inner wall portion 4b of the intermediate cross section 4. At the same time there are provided substantially inclined yoke portions 5c between the straight inner wall portion 5b and the outer wall portion 5a.

The cross section 3 at the terminal portions, see specifically FIG. 3, is in this embodiment compressed or folded to comprise a substantially straight outer wall portion 3a having substantially the same height H3 as that of the outer wall portion 4a, i.e. height H4, of the intermediate cross section 4, see FIG. 4, as well as an inner wall portion 3b which is folded out to a larger height h3 than that of the inner wall portion 4b, i.e. height h4, and intermediate arched or wavy yoke portions 3c. Alternatively the terminal portions can remain unprocessed.

In the embodiment illustrated in FIGS. 2–5, the starting portion is a cross section 4, see FIG. 4, which constitutes a closed cross section. The outer wall portion 4a at its ends 4a', 4a", and the inner wall portion 4b are provided with or comprise portions having a larger wall thickness than the wall thickness of the intermediate yoke portions 4c and the dividing wall 4d.

Figure 6:
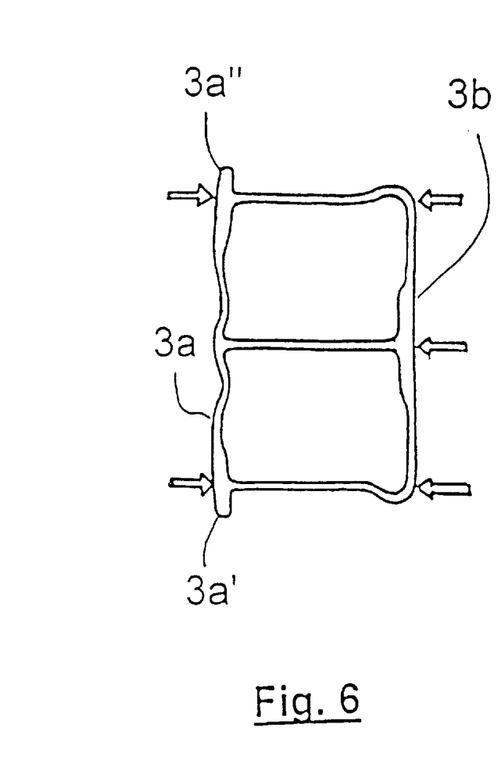
FIG. 6 shows a schematic distribution of forces when reforming the blank at the portion according to FIG. 3.
Figure 7:
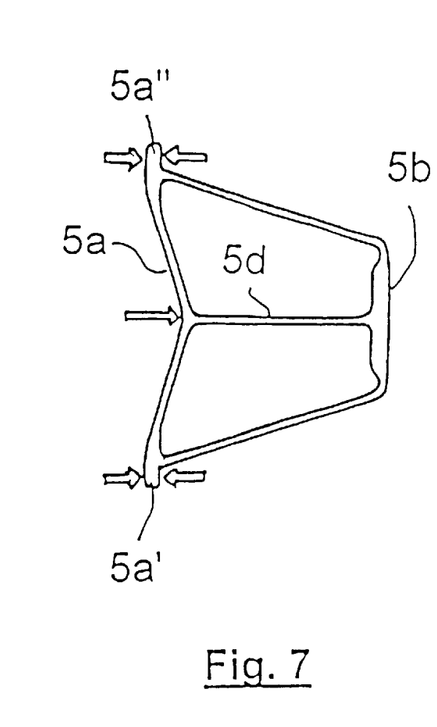
FIG. 7 shows a schematic distribution of forces when reforming the blank at the portion according to FIG. 5.

FIGS. 6 and 7 show a schematic distribution of forces as a blank is reformed.

FIG. 6 shows the forming of a blank at its terminal portions, to obtain the cross section as shown in FIG. 3. The blank is compressed or folded by forces at the inner wall portion 3b, while these forces are opposed by forces at each end 3a', 3a" of the outer wall portion 3a.

FIG. 7 shows the forming of the blank at its center portion, see FIG. 5. Here the blank is attached or clamped at the ends 5a', 5a" of the outer wall portion 5a, while a force is applied at the center of surface 5a, whereby the dividing wall 5d transmits forces between the outer and the inner walls 5a, 5b of the blank as the blank is processed to an outwardly pressed cross section in this portion.

Figure 8:
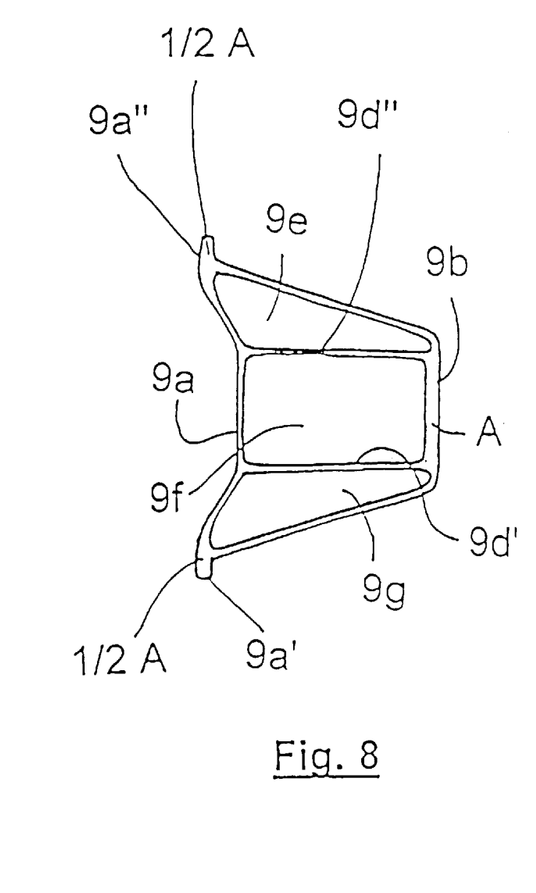
FIG. 8 shows in an embodiment a cross section of a structural beam provided with two dividing walls.

FIG. 8 shows an alternative cross section of the blank in the outwardly pressed section. The blank its made out of a profile having two dividing walls 9d', 9d", dividing the interior section of the blank into three chambers 9e, 9f, and 9g. The area of the enlarged end portions 9a', 9a" of the outer wall 9a are preferably in sum of same magnitude as the area of the inner wall portion 9b.

Figure 10:
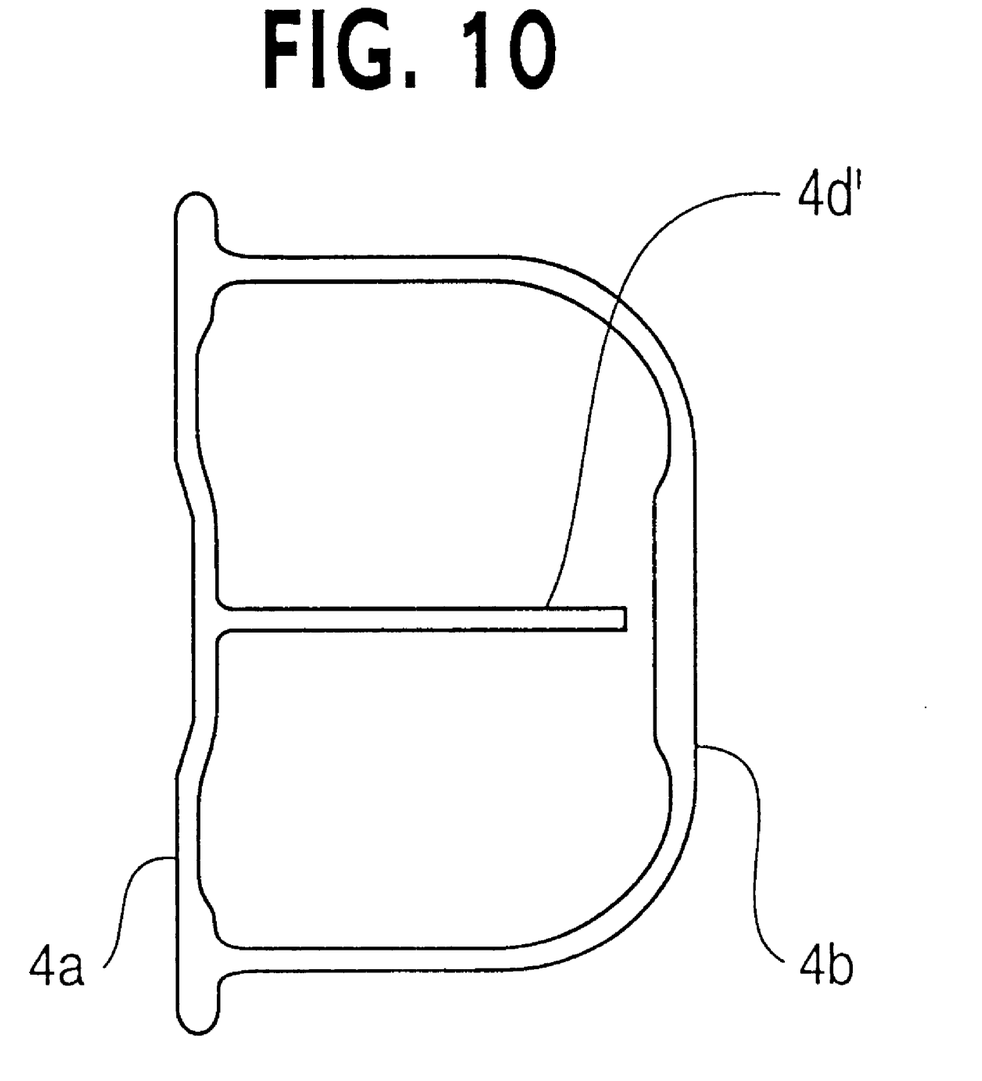
FIG. 10 shows a variation of the present invention, wherein a protrusion is provided instead of a dividing wall.

FIG. 10 shows a variation of the present invention, wherein a protrusion 4d' is provided in place of the dividing wall 4d. Unlike the dividing wall 4d, the protrusion 4d' does not interconnect the outer wall and the inner wall 4b in the basic cross section.

In accordance with the bumper of this invention, by having as a starting point a basic cross section which is more or less kept unchanged on each side of the center, while at the same time the center portion is processed to an outwardly pressed cross section and the side portions or terminal portions are compressed or folded, with the cross section including at least one dividing wall, it is possible to achieve a specifically favorable resilient effect upon collision at velocities up to 4 km/h, and at velocities above 4 km/h will also exhibit favorable collision qualities. The overall profile will be able to absorb more energy as compared with corresponding bumper rails.

Additionally, there is, by this form of the rail, secured a very favorable torsional stiffness, since the hollow chamber profile is maintained and the bumper blank can be processed by continuously working the blank.

It is to be understood that the profile or bumper rail can be made substantially symmetrical about a center plane running on the longitudinal direction of the vehicle, and provided with an outer mantle of plastic material.

If the structural beam according to the invention is to be used as a structural element in the vehicle as such, this symmetrical design can appropriately be alleviated.

Appropriately, the terminal portions may merge into attachment portions, with the attachment portions being provided with a net parallel surface positioned against side beams of the vehicle.

It is to be understood that the processing of the blank can take place by first stretching the blank to the basic shape, especially an arched shape in the longitudinal direction of the blank, and then simultaneously processing the blank at the center portion and the terminal portions.

Alternatively, the processing may be performed by performing a hydroforming operation (not shown).

Figure 9:
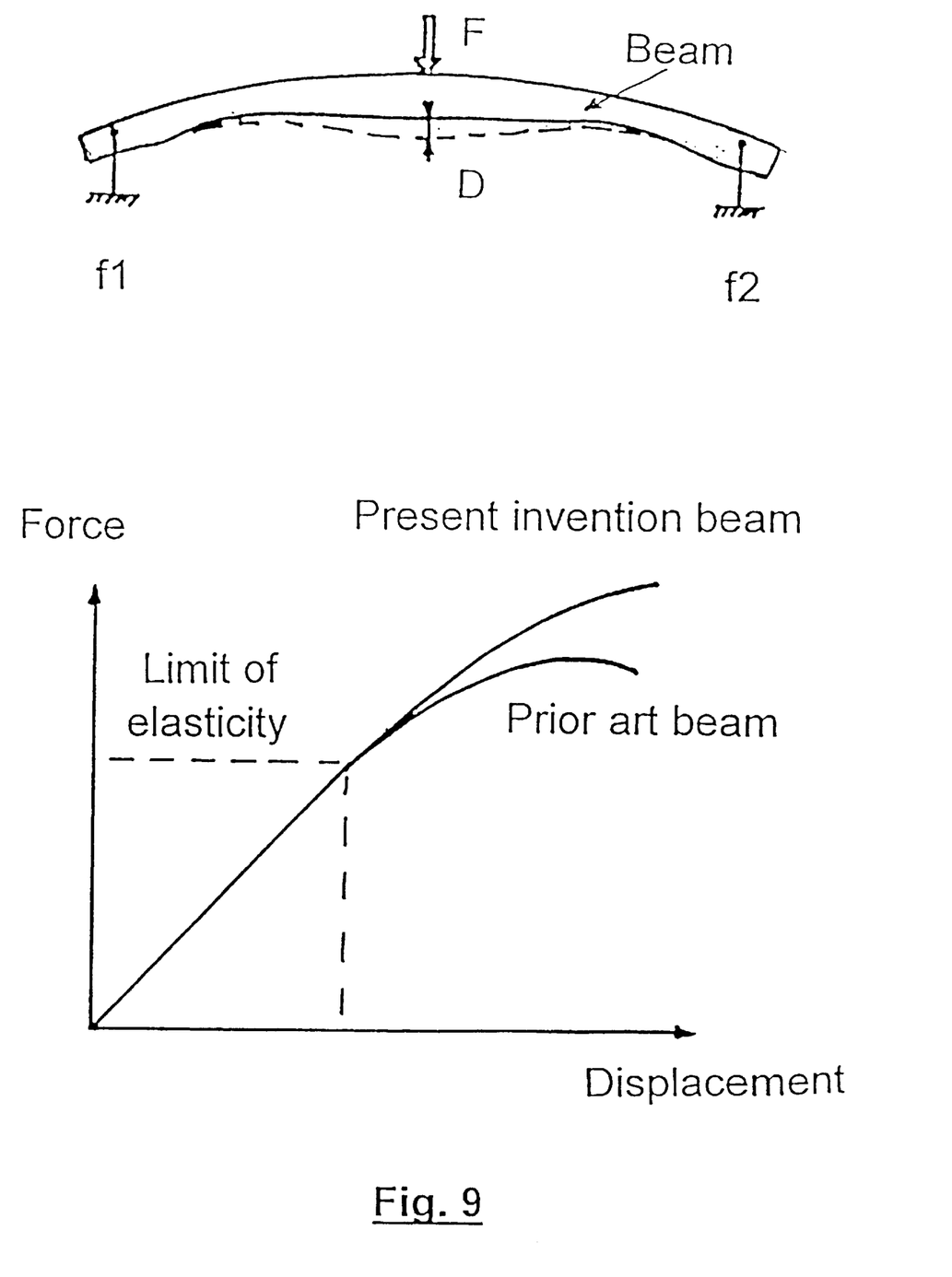
FIG. 9 is a diagram that displays the ability of absorbing elastic energy in a beam according to the invention in comparison to a prior art beam.

In FIG. 9 the ability absorb elastic energy in a beam according to the invention as compared to a prior art beam is displayed. The curves are established by measuring the displacement D of a beam supported at its terminal portions f1, f2, under the influence of a force F acting in the central portion of the beam.

The comparative diagram shows that the present invention beam is able to absorb more elastic and plastic energy than the prior art bumper.

This is due to the beam being substantially less prone to buckling in the front wall, and less prone to collapse of the cross section under bending loads.

What is claimed is:

1. A beam or bumper for a vehicle, which beam or bumper upon collision is adapted to absorb collision energy and forces, said beam or bumper comprising:
   an arched member having an outer wall, an inner wall, a hollow interior between said outer wall and said inner wall, and at least one dividing wall or protrusion extending substantially perpendicularly from said inner wall and dividing at least part of said hollow interior into at least two chambers, with said arched member having different cross sections along its length, said different cross sections including
   (i) a first cross section on each side of a central portion of said arched member, (ii) a second cross section at said central portion, with said second cross section exhibiting a region that extends outwardly relative to said first cross section, and (iii) a third cross section adjacent each terminal end of said arched member, with said third cross section being generally the same as said first cross section or with said first cross section exhibiting a region that extends outwardly relative to said third cross section.

2. The beam or bumper according to claim 1, wherein said arched member is formed from a hollow blank having a basic cross section, with said first cross section corresponding to said basic cross section being unchanged, with said second cross section corresponding to said basic cross section after said basic cross section has been outwardly pressed, and with said third cross section (i) corresponding to said basic cross section after said basic cross section has been folded or compressed, when said first cross section exhibits a region that extends outwardly relative to said third cross section, or (ii) corresponding to said basic cross section being unchanged, when said third cross section is generally the same as said first cross section.

3. The beam or bumper according to claim 2, wherein said at least one dividing wall interconnects said outer wall and said inner wall.

4. The beam or bumper according to claim 3, wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall that extends substantially perpendicularly from said central portion of said inner wall, with said central portion of said outer wall being of a height that is greater than a height of said central portion of said inner wall, wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall that extends substantially perpendicularly from said centrally offset portion of said inner wall, with said centrally offset portion of said outer wall having a height that is at least equal to a height of said central portion of said outer wall and greater than a height of said centrally offset portion of said inner wall, and wherein (i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and (ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

5. The beam or bumper according to claim 3, wherein there are two dividing walls such that said at least part of said hollow interior is divided into three chambers.

6. The beam or bumper according to claim 2, wherein said at least one dividing wall or protrusion divides said at least part of said hollow interior into two substantially equal chambers.

7. The beam or bumper according to claim 6, wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall or protrusion that extends substantially perpendicularly from said central portion of said inner wall, with said central portion of said outer wall being of a height that is greater than a height of said central portion of said inner wall, wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall or protrusion that extends substantially perpendicularly from said centrally offset portion of said inner wall, with said centrally offset portion of said outer wall having a height that is at least equal to a height of said central portion of said outer wall and greater than a height of said centrally offset portion of said inner wall, and wherein (i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and (ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

8. The beam or bumper according to claim 6, wherein there are two dividing walls or protrusions such that said at least part of said hollow interior is divided into three chambers.

9. The beam or bumper according to claim 2, wherein said inner wall has a thickness that is greater than a thickness of said at least one dividing wall or protrusion.

10. The beam or bumper according to claim 9,
wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall or protrusion that extends substantially perpendicularly from said central portion of said inner wall, with said central portion of said outer wall being of a height that is greater than a height of said central portion of said inner wall,
wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall or protrusion that extends substantially perpendicularly from said centrally offset portion of said inner wall, with said centrally offset portion of said outer wall having a height that is at least equal to a height of said central portion of said outer wall and greater than a height of said centrally offset portion of said inner wall, and
wherein
(i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and
(ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

11. The beam or bumper according to claim 9, wherein there are two dividing walls or protrusions such that said at least part of said hollow interior is divided into three chambers.

12. The beam or bumper according to claim 2, wherein said outer wall portion has upper and lower parts each with a thickness that is greater than a thickness of said at least one dividing wall or protrusion.

13. The beam or bumper according to claim 12,
wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall or protrusion that extends substantially perpendicularly from said central portion of said inner wall, with said central portion of said outer wall being of a height that is greater than a height of said central portion of said inner wall,
wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall or protrusion that extends substantially perpendicularly from said centrally offset portion of said inner wall, with said centrally offset portion of said outer wall having a height that is at least equal to a height of said central portion of said outer wall and greater than a height of said centrally offset portion of said inner wall, and
wherein
(i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and
(ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

14. The beam or bumper according to claim 12, wherein there are two dividing walls or protrusions such that said at least part of said hollow interior is divided into three chambers.

15. The beam or bumper according to claim 2,
wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall or protrusion that extends substantially perpendicularly from said central portion of said inner wall, with said central portion of said outer wall being of a height that is greater than a height of said central portion of said inner wall, wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall or protrusion that extends substantially perpendicularly from said centrally offset portion of said inner wall, with said centrally offset portion of said outer wall having a height that is at least equal to a height of said central portion of said outer wall and greater than a height of said centrally offset portion of said inner wall, and wherein
(i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and (ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

16. The beam or bumper according to claim 15, wherein there are two dividing walls or protrusions such that said at least part of said hollow interior is divided into three chambers.

17. The beam or bumper according to claim 2, wherein there are two dividing walls or protrusions such that said at least part of said hollow interior is divided into three chambers.

18. The beam or bumper according to claim 1, wherein said at least one dividing wall interconnects said outer wall and said inner wall.

19. The beam or bumper according to claim 1, wherein said at least one dividing wall or protrusion divides said at least part of said hollow interior into two substantially equal chambers.

20. The beam or bumper according to claim 1, wherein said inner wall has a thickness that is greater than a thickness of said at least one dividing wall or protrusion.

21. The beam or bumper according to claim 1, wherein said outer wall portion has upper and lower parts each with a thickness that is greater than a thickness of said at least one dividing wall or protrusion.

22. The beam or bumper according to claim 1,
wherein said second cross section is defined by a concaved central portion of said outer wall, a central portion of said inner wall, central portions of yokes that interconnect said outer wall and said inner wall and are slanted relative to said central portion of said inner wall and said central portion of said outer wall, and a central portion of said at least one dividing wall or protrusion that extends substantially perpendicularly from said central portion of said inner wall, with said central portion of said outer wall being of a height that is greater than a height of said central portion of said inner wall, wherein said first cross section is defined by a generally flat or contoured centrally offset portion of said outer wall, an arched centrally offset portion of said inner wall, centrally offset portions of said yokes that interconnect said inner wall and said outer wall and extend substantially perpendicularly from said centrally offset portion of said outer wall, and a centrally offset portion of said at least one dividing wall or protrusion that extends substantially perpendicularly from said centrally offset portion of said inner wall, with said centrally offset portion of said outer wall having a height that is at least equal to a height of said central portion of said outer wall and greater than a height of said centrally offset portion of said inner wall, and wherein
(i) when said first cross section exhibits a region that extends outwardly relative to said third cross section, said third cross section is defined by a terminal portion of said outer wall, a terminal portion of said inner wall, and terminal portions of said yokes that interconnect said inner wall and said outer wall and have an arched or wavy configuration, with said terminal portion of said outer wall having a height that is substantially the same as the height of said central portion of said outer wall, and with said terminal portion of said inner wall having a height that is greater than the height of said centrally offset portion of said inner wall, and (ii) when said third cross section is generally the same as said first cross section, said third cross section is defined by a generally flat or contoured terminal portion of said outer wall, an arched terminal portion of said inner wall, and terminal portions of said yokes that interconnect said inner wall and said outer wall and extend substantially perpendicularly from said centrally offset portion of said outer wall, with said terminal portion of said outer wall having a height that is at least equal to the height of said central portion of said outer wall and greater than a height of said terminal portion of said inner wall.

23. The beam or bumper according to claim 1, wherein there are two dividing walls or protrusions such that said at least part of said hollow interior is divided into three chambers.

24. A method of manufacturing a beam or bumper for a vehicle, which beam or bumper upon collision is adapted to absorb collision energy and forces, said method comprising:
performing operations on a blank having a basic cross section defined by an inner wall, an outer wall, a hollow interior between said outer wall and said inner wall, and at least one dividing wall or protrusion extending substantially perpendicularly from said inner wall and dividing at least a part of said hollow interior into at least two chambers, such that
(i) a central portion of said blank said at least one dividing wall or protrusion transmits a force from said outer wall to said inner wall, whereby the cross section at said central portion becomes outwardly pressed such that this outwardly pressed cross section exhibits a region that extends outwardly relative to said basic cross section,
(ii) on each side of said central portion said basic cross section remains unchanged, and
(iii) adjacent to each terminal end of said blank
   (a) said basic cross section remains unchanged, or
   (b) the cross section becomes folded or compressed such that said basic cross section exhibits a region that extends outwardly relative to this folded or compressed cross section.

25. The method according to claim 24, wherein the performance of operations on said blank includes stretching or pressing of said blank into an arched configuration along a longitudinal direction of said blank, and (i), (ii) and (iii) occur simultaneously with or subsequently to said stretching or pressing.

26. The method according to claim 24, wherein said blank is an extruded blank and further has yokes that interconnect said inner wall and said outer wall such that a closed section is defined, with said inner wall and ends of said outer wall each having a thickness that is greater than a thickness of each of said yokes and said at least one dividing wall or protrusion.

27. The method according to claim 24, wherein said at least one dividing wall interconnects said inner wall and outer wall.

* * * * *